United States Patent [19]

Watanabe

[11] Patent Number: 4,751,054

[45] Date of Patent: Jun. 14, 1988

[54] APPARATUS FOR REMOVING $NO_x$ FROM A GAS

[75] Inventor: Tsuyoshi Watanabe, Kure, Japan

[73] Assignee: Babcock - Hitachi Kabushiki Kaisha, Tokyo, Japan

[21] Appl. No.: 886,058

[22] Filed: Jul. 16, 1986

[30] Foreign Application Priority Data

Jul. 16, 1985 [JP] Japan ................... 60-155101

[51] Int. Cl.⁴ .................... G05D 7/00; B01D 53/34
[52] U.S. Cl. .................... 422/111; 422/168; 364/500
[58] Field of Search .......... 422/62, 107, 108, 110, 422/111, 168; 364/500; 423/235, 235 D, 239, 239 A; 436/116-118

[56] References Cited

U.S. PATENT DOCUMENTS

| | | | |
|---|---|---|---|
| 3,977,836 | 8/1976 | Matsuda et al. | 436/116 |
| 4,302,205 | 11/1981 | Muraki et al. | 422/62 |
| 4,302,419 | 11/1981 | Abrams et al. | 422/62 |
| 4,473,536 | 9/1984 | Carberg et al. | 422/62 |
| 4,473,537 | 9/1984 | Ford, Jr. et al. | 422/62 |
| 4,565,679 | 1/1986 | Michalak et al. | 422/62 |

FOREIGN PATENT DOCUMENTS 2902706  7/1979  Fed. Rep. of Germany ........ 422/62

Primary Examiner—David L. Lacey
Attorney, Agent, or Firm—Antonelli, Terry & Wands

[57] ABSTRACT

An ammonia injection rate to an apparatus for catalytically removing nitrogen oxides from a combustion flue gas in the presence of ammonia, provided in a flue gas passage, is controlled in accordance with changes in load by a system comprising a mole ratio computing unit for computing a mole ratio signal from a gas temperature signal from a gas temperature dector, an inlet $NO_x$ detection signal from an inlet $NO_x$ detector, a gas flow rate detection signal from a gas flow rate detector, and a leaked $NH_3$ setting signal from a leaked $NH_3$ setting unit; a leaked $NH_3$ computing unit for computing a leaked $NH_3$ computing signal from the inlet $NO_x$ detection signal from the inlet $NO_x$ detector, an outlet $NO_x$ detection signal from an outlet $NO_x$ detector, and the mole ratio signal from the mole ratio computing unit; and a comparator for computing a leaked $NH_3$ deviation signal from the leaked $NH_3$ setting signal and the leaked $NH_3$ computing signal, the leaked $NH_3$ deviation signal being added to the mole ratio signal, thereby obtaining a mole ratio-correcting signal, and an ammonia injection rate being controlled by the mole ratio correcting signal.

8 Claims, 2 Drawing Sheets

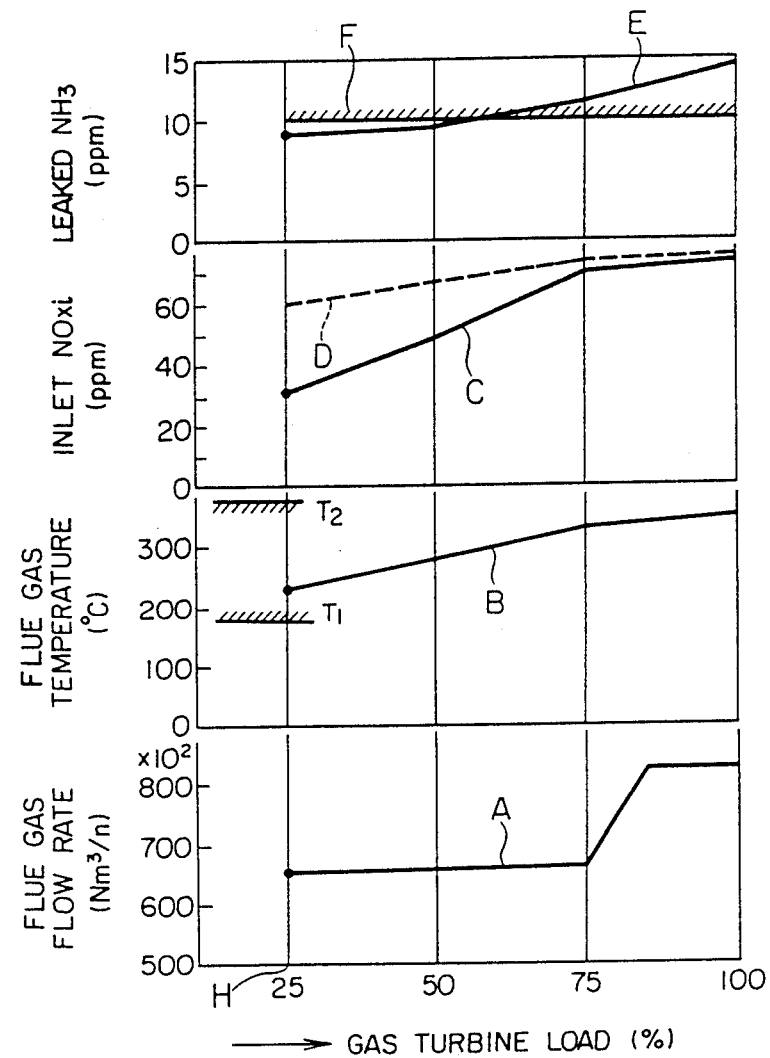

APPARATUS FOR REMOVING NO$_x$ FROM A GAS

BACKGROUND OF THE INVENTION

This invention relates to a system for controlling an ammonia injection rate for an apparatus for removing nitrogen oxides (NO$_x$) from a combustion flue gas discharged from a waste heat recovery boiler in a combined power plant.

Large capacity thermal power plants have been under construction to meet increasing power demands, and it is required that their boilers are operated under various pressures to obtain a high power generation efficiency even under a partial load, because the thermal power generation tends to shift from a base load operation to a load adjustment owing to the increasing atomic power generation and also to the increasing difference between the maximum load and the minimum load, which are characteristic of the recent power demands. That is, in the thermal power plants, the boilers are operated not always under a full load, but under variable load of 75%, 50%, or 25% full load in the daytime, or the boiler operation is discontinued in the night, for example, according to the so called Daily Start-Stop operation schedule, which will be hereinafter referred to merely as "DSS operation schedule", whereby such intermediate loads are borne to improve the power generation efficiency.

As part of improvements in the highly efficient power generation, combined power plants have been recently regarded as important. In the combined power plants, power generation is carried out by a gas turbine, and the heat possessed by the flue gas discharged from the gas turbine is recovered in a waste heat recovery boiler, while the steam generated in the waste heat recovery boiler drives a steam turbine also to conduct the power generation.

The combined power plant has a high power generation efficiency owing to power generation by both gas turbine and steam turbine, and also has a good load response. Thus, the combined power plant has a good load follow up capable of fully meeting a drastic increase in the power demand as an advantage and is particularly effective for the DSS operation schedule.

However, in the combined power plant, so called clean fuel such as LNG, kerosene, etc. is used, and thus SO$_x$ or dusts is less evolved, but the combustion in the gas turbine requires much combustion air, and the amount of NO$_x$ is increased in the flue gas due to the high temperature combustion. Thus, a waste heat recovery boiler provided with an apparatus for removing nitrogen oxides has been used (U.S. Pat. No. 4,466,241).

In FIG. 2, a combined power plant is schematically shown, where numeral 1 is a gas turbine, 2 a flue gas passage for a flue gas G from the gas turbine 1, 3 a superheater, 4 a primary evaporator, 5 an apparatus for removing nitrogen oxides, 6 a secondary evaporator, and 7 an economizer. The superheater 3, the primary and secondary evaporators 4 and 6, the apparatus for removing nitrogen oxides 5 and the economizer 7 are provided in the flue gas passage 2. Numeral 8 is a steam-generating drum, 9 a steam turbine driven by the steam generated in the drum 8, 10 a condenser for condensing the steam to water, and 11 a condensate pump for feeding the water from the condenser 10 to the drum 8.

The water in the condenser 10 is led to the economizer 7 by the condensate pump 11 as feedwater W, preheated with the flue gas G in the economizer 7, and then fed to the drum 8. The water in the drum 8 goes downwards through a descending pipe 13 and led to the evaporators 4 and 6 through lines 14a and 14b, respectively, and returned to the drum 8 through lines 15a and 15b, respectively. During the cyclic flow of the water, steam generated in the evaporators 4 and 6 by heating with the flue gas G is led to the superheater 3 from the drum 8 through a saturated steam pipe 16, and superheated by the flue gas G and fed to the steam turbine 9 through a main steam pipe 17. Numeral 18 is a turbine bypass pipe branched from the main steam pipe 17 to lead the steam directly to the condenser 10 while bypassing the steam turbine 9. Numeral 19 is a steam turbine control valve for controlling the feed rate of steam to the steam turbine 9, 20 a turbine bypass valve for controlling a bypass rate of steam by the feed rate of steam to the steam turbine 9, and 21 a damper in the flue gas passage 2.

In the foregoing, the combined power plant has been outlined. Generally the waste heat recovery boiler is provided with an apparatus for removing nitrogen oxides 5 therein to recover the heat from the flue gas and remove nitrogen oxides simultaneously. In order to attain an effective nitrogen oxides-removing action of the catalyst filled in the apparatus for removing nitrogen oxides, it is necessary to keep the catalyst within a specific temperature range. Outside the specific temperature range, the nitrogen oxide-removing effect of the catalyst is reduced.

FIGS. 3 (a), 3(b), 3(c) and 3(d) show characteristic diagrams between the gas turbine load on the axis of abscissa and leaked NH$_3$, inlet NO$_x$, flue gas temperature or flue gas flow rate on the axis of ordinate, where curve A is plotted for changes in the flue gas flow rate, curve B for changes in the flue gas temperature, curve C for inlet NO$_x$ (NO$_{xi}$), curve D for NO$_x$ in terms of 6% O$_2$, curve E for changes in leaked NH$_3$, and straight line F for the control value of leaked NH$_3$. In FIG. 3 (c), T$_1$ and T$_2$ show a temperature range for effective nitrogen oxides-removing action of the catalyst, and in FIG. 3 (d) point H shows a design point.

The temperature range between T$_1$ and T$_2$ is generally from 180° to 400° C., but a higher catalyst activity is obtained substantially around 350° C. However, as already explained referring to FIG. 2, heat transfer pipes of superheater 3 for superheating steam and evaporator 4 for evaporating feedwater are provided on the upsteam side of the apparatus for removing nitrogen oxides 5, and thus the flue gas is deprived of the heat by these heat transfer pipes of superheater 3 and evaporator 4 and the inlet temperature of the apparatus for removing nitrogen oxides 5 is considerably lowered at a low load operation or at a low flue gas rate. Thus, the design point H of the apparatus for removing nitrogen oxides 5 will be at a lower flue gas temperature with a lower catalyst activity, as shown in FIG. 3 (c), and the catalyst amount and NH$_3$ injection molar ratio will be set to meet these conditions.

However, when a gas turbine load is increased as shown by curve A in FIG. 3 (d), the inlet NO$_x$ will be increased as shown by curve C in FIG. 3 (b). Thus, when the constant mole ratio control based on the maximum mole ratio set at the design point H is carried out, as in a conventional manner, the leaked NH$_3$ (S-NH$_3$) will be increased with increasing load as shown by curve E in FIG. 3 (a). Curve E will exceed the control value F.

The leaked NH$_3$ can be given by the following equation (1):

$$S-NH_3 = (M-\eta) \times NO_{xi} \quad (1)$$

wherein
S—NH$_3$: leaked NH$_3$ (ppm)
M: set mole ratio (—)
$\eta$: nitrogen oxide removal efficiency (—) Flue gas temperature increase with increasing load, and the nitrogen oxide removal efficiency is somewhat improved (no considerable increase).
NO$_{xi}$: inlet NO$_x$ (ppm)

On the other hand, when the conventional constant outlet NO$_x$ control is carried out, the amount of NH$_3$ to be injected can be reduced, and most economical operation can be made, but when there are considerable changes in load as in DSS operation schedule in a combined power plant, there is a less allowance between the outlet NO$_x$ and the control value, leading to poor follow up and such a disadvantage that the outlet NO$_x$ concentration exceeds the control value.

Generally, NH$_3$/NO$_x$ mole ratio for NH$_3$ to be injected to remove nitrogen oxides can be represented by the following equation (2), and thus must be set to meet the inlet NO$_{xi}$:

$$M' = \frac{NO_{xi} - NO_{xo} + (S - NH_3)}{NO_{xi}} = \eta + \frac{(S - NH_3)}{NO_{xi}} \quad (2)$$

wherein:
M': NH$_3$/NO$_x$ mole ratio (—)
NO$_{xi}$: inlet NO$_x$ (ppm)
NO$_{xo}$: outlet NO$_x$ (ppm)
S—NH$_3$: leaked NH$_3$ (ppm)
$\eta$: nitrogen oxide removal efficiency (—)

However, in the case of an apparatus for removing nitrogen oxides for a gas turbine, changes in load are vigorous, and when the mole ratio is set by equation (2), there is a less allowance for the upper limit to the outlet NO$_x$, and thus there is a high possibility that the outlet NO$_x$ exceeds the control value.

SUMMARY OF THE INVENTION

An object of the present invention is to overcome the disadvantages of the prior art and to provide a system for controlling an ammonia injection rate, capable of reducing an ammonia injection rate which will be in excess with increasing load and preventing outlet NO$_x$ and leaked ammonia (S—NH$_3$) from exceeding the control value even when a load is drastically changed, as peculiar to the gas turbine.

The object of the present invention can be attained according to a system for controlling an ammonia injection rate in an apparatus for catalytically removing nitrogen oxides from a combustion flue gas in the presence of ammonia, provided in a flue gas passage, which comprises a mole ratio computing unit for computing a mole ratio signal from a gas temperature detection signal from a gas temperature detector, an inlet NO$_x$ detection signal from an inlet NO$_x$ detector, a gas flow rate detection signal from a gas flow rate detector, and a leaked NH$_3$ setting signal from a leaked NH$_3$ setting unit; a leaked NH$_3$ computing unit for computing a leaked NH$_3$ computing signal from the inlet NO$_x$ detection signal from the inlet NO$_x$ detector, an outlet NO$_x$ detection signal from an outlet NO$_x$ detector, and the mole ratio signal from the mole ratio computing unit; and a comparator for computing a leaked NH$_3$ deviation signal from the leaked NH$_3$ setting signal and the leaked NH$_3$ computing signal, the leaked NH$_3$ deviation signal being added to the mole ratio signal, thereby obtaining a mole ratio-correcting signal, and the ammonia injection rate being controlled by the mole ratio-controlling signal.

The present invention will be described in detail below, referring to one embodiment by way of the accompanying drawings.

BRIEF DESCRIPTION OF THE DRAWINGS

FIGS. 3 (a), 3(b), 3(c) and 3(d) are characteristic diagrams showing relationships between the gas turbine load on the axis of abscissa, and the leaked NH$_3$, inlet NO$_x$, flue gas temperature, and flue gas flow rate on the axis of ordinate, respectively.

PREFERRED EMBODIMENTS OF THE INVENTION

Figure 1:
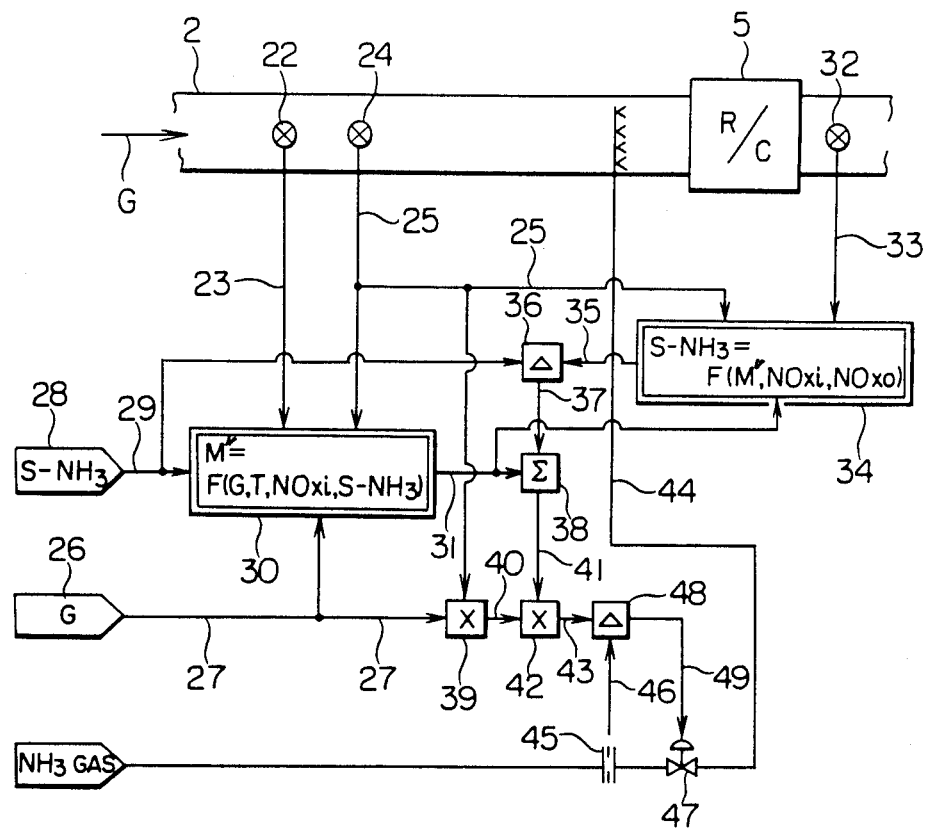
FIG. 1 is a control flow diagram of a system for controlling an ammonia injection ratio according to one embodiment of the present invention.
Figure 2:
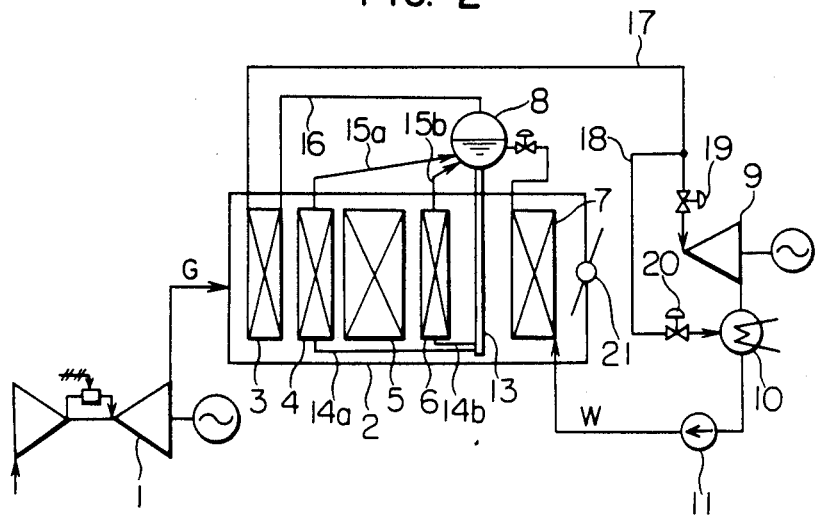
FIG. 2 is a schematic flow diagram of a combined power plant.

In FIG. 1, numeral 2 is a flue gas passage and 5 an apparatus for removing nitrogen oxides, as identical with those shown in FIG. 2. Numeral 22 is a gas temperature detector; 23 a gas temperature detection signal; 24 an inlet NO$_x$ detector; 25 an inlet NO$_x$ detection signal; 26 a gas flow rate detector; 27 a gas flow rate detection signal; 28 a leaked NH$_3$ setting unit; 29 a leaked NH$_3$ setting signal; 30 a mole ratio computing unit for computing a mole ratio from the gas temperature detection signal 23; the inlet NO$_x$ detection signal 25; the gas flow rate detection signal 27 and the leaked NH$_3$ setting signal 29; 31 a mole ratio signal; 32 an outlet NO$_x$ detector; 33 an outlet NO$_x$ detection signal; 34 a leaked NH$_3$ computing unit for computing a leaked NH$_3$ amount from the mole ratio signal 31 and the outlet NO$_x$ detection signal 33; 35 a leaked NH$_3$ computing signal; 36 a comparator; 37 a leaked NH$_3$ deviation signal; 38 an adder; 39 a multiplier; 40 a total NO$_x$ amount signal; 41 a mole ratio-correcting signal; 42 a multiplier; 43 a required NH$_3$ flow rate signal; 44 an NH$_3$ injection pipe; 45 an NH$_3$ flow rate detector; 46 an NH$_3$ flow rate detection signal; 47 an NH$_3$ control valve; 48 a comparator; and 49 a valve-controlling signal.

Before describing the embodiment of the present invention, the equation (2) will be explained at first below.

The nitrogen oxide removal efficiency $\eta$ used in the equation (2) generally depends on gas conditions such as the temperature and flow rate of a flue gas, inlet NO$_x$ concentration, etc., and usually increases with increasing temperature. That is, the nitrogen oxide removal efficiency $\eta$ can be increased without any increase of leaked NH$_3$ (S—NH$_3$), and the ammonia injection ratio can be increased in accordance with a drastic increase in load of a gas turbine.

The present invention provides a system for controlling an ammonia injection rate operable at a NH$_3$/NO$_x$ mole ratio as high as the S—NH$_3$ control valve can permit by computing the molar ratio in the mole ratio computing unit 30 according to the following equation (3) to correct the mole ratio M" for ammonia to be injected of equation (2) with the gas conditions as mentioned above:

$$M' = F(G, T, NO_{xi}, S-NH_3) \quad (3)$$

wherein
  G: flue gas flow rate (N m³/hr)
  T: flue gas temperature (°C.)
  $NO_{xi}$: inlet $NO_x$ (ppm)
  $S-NH_3$: leaked $NH_3$ (ppm)

In addition, $H_2O$, $O_2$, etc. contained in the flue gas have a little influence on the computation of the molar ratio, but their proportion is so small that their average value is input in the computation as a constant.

Furthermore, $S-NH_3$ is computed in the leaked $NH_3$ computing unit 34 according to the following equation (4) to obtain a deviation from the control value without using an $NH_3$ meter having an accuracy problem as a practical unit and correct the mole ratio:

$$S-NH_3 = F(M'', NO_{xi}, NO_{xo}) \quad (4)$$

wherein
  $S-NH_3$: leaked $NH_3$ (ppm)
  $NO_{xi}$: inlet $NO_x$ (ppm)
  $M''$: $NH_3/NO_x$ mole ratio (—)
  $NO_{xo}$: outlet $NO_x$ (ppm)

In FIG. 1, a gas temperature detection signal 23 from the gas temperature detector 22, an inlet $NO_x$ detection signal 25 from the inlet $NO_x$ detector 24, a gas flow rate detection signal 27 from the gas flow detector 26, and a leaked $NH_3$ setting signal 29 from the leaked $NH_3$ ($S-NH_3$) setting unit 28 are input into the mole ratio computing unit 30, where a mole ratio signal 31 is computed according to the equation (3).

On the other hand, an inlet $NO_x$ detection signal 25 from the inlet $NO_x$ detector 24, the mole ratio signal 31 from the mole ratio computing unit 30, and an outlet $NO_x$ detection signal 33 from the outlet $NO_x$ detector 32 are input into the leaked $NH_3$ computor 34, where a leaked $NH_3$ computing signal 35 is computed according to the equation (4).

Then, the leaked $NH_3$ setting signal 29 from the leaked $NH_3$ setting unit 28 and the leaked $NH_3$ computing signal 35 from the leaked $NH_3$ computing unit 34 are compared in the comparator 36 to obtain a leaked $NH_3$ deviation signal 37, which is input into the adder 38.

In the adder 38, the leaked $NH_3$ deviation signal 37 from the comparator 36 is added to the mole ratio signal 31 from the mole ratio computing unit 30 to obtain a mole ratio-correcting signal 41, which is input into a multiplier 42.

On the other hand, the inlet $NO_x$ detection signal 25 from the inlet $NO_x$ detector 24 and the gas flow rate detection signal 27 from the gas flow rate detector 26 are input into the multiplier 39 to compute a total $NO_x$ amount signal 40, which is input into the multiplier 42.

In the multiplier 42, a required $NH_3$ flow rate signal 43 is computed from the total $NO_x$ amount signal 40 and the mole ratio-correcting signal 41.

On the other hand, a $NH_3$ flow rate through the $NH_3$ injection pipe 44 is detected as an $NH_3$ flow rate detection signal 46 from the $NH_3$ flow rate detector 45 and input into the comparator 48, where the $NH_3$ flow rate detection signal 46 and the required $NH_3$ flow rate signal 43 are compared, and the degree of opening of the $NH_3$ control valve 47 is adjusted by a valve-controlling signal 49 by the deviation computed in the comparator 48 to control the $NH_3$ flow rate through the $NH_3$ injection pipe 44.

By adding the leaked $NH_3$ deviation signal 37 to the mole ratio signal 31 from the mole ratio computing unit 30, thereby obtaining a mole ratio-correcting signal 41 and adjusting the mole ratio of $NH_3$ to be injected to the apparatus for removing nitrogen oxides by the mole ratio-correcting signal 41, the leaked $NH_3$ amount can be made less, and the mole ratio of $NH_3$ to be injected can be controlled in accordance with a load, even if the load is drastically increased according to the DSS operation schedule.

In the present invention, the amount of $NH_3$ to be injected can be controlled in accordance with an increase in the load, and the outlet $NO_x$ and the leaked $NH_3$ can be controlled below the control value even if the load is drastically increased according to the DSS operation schedule.

What is claimed is:

1. An apparatus for removing $NO_x$ from gases which comprises:
    an $NO_x$ removal unit provided in a flue gas passage and having means to inject ammonia into said passage;
    a gas temperature detector provided in fluid communication with said gas passage and upstream of said $NO_x$ removal unit for generating a gas temperature detection signal;
    an inlet $NO_x$ detector provided in fluid communication with said gas passage and upstream of said $NO_x$ removal unit for generating an inlet $NO_x$ detection signal;
    a gas flow rate detector provided in fluid communication with said gas passage for generating a gas flow rate detection signal;
    a leaked $NH_3$ setting unit for generating a leaked $NH_3$ setting signal;
    an outlet $NO_x$ detector provided in said flue gas passage downstream of said $NO_x$ removal unit for generating an outlet $NO_x$ detection signal;
    a mole ratio computing unit for computing a mole ratio signal from the gas temperature detection signal, the inlet $NO_x$ detection signal, the gas flow rate detection signal and the leaked $NH_3$ setting signal;
    means for transmitting each of the gas temperature detection signal from said gas temperature detector, the inlet $NO_x$ detection signal from said inlet $NO_x$ detector, the gas flow rate detection signal from said gas flow rate detector and the leaked $NH_3$ setting signal from said leaked $NH_3$ setting unit to said mole ratio computing unit;
    a leaked $NH_3$ computing unit for computing a leaked $NH_3$ computing signal from the inlet $NO_x$ detection signal, the outlet $NO_x$ detection signal and the mole ratio signal;
    means for transmitting each of the inlet $NO_x$ detection signal from said inlet $NO_x$ detector, the outlet $NO_x$ detection signal from said outlet $NO_x$ detector and the mole ratio computing unit to said leaked $NH_3$ computing unit;
    a comparator for computing a leaked $NH_3$ deviation signal from the leaked $NH_3$ setting signal and the leaked $NH_3$ computing signal;
    means for transmitting each of the leaked $NH_3$ setting signal from said leaked $NH_3$ setting unit and the leaked $NH_3$ computing signal from said leaked $NH_3$ computing unit to said comparator;

means for adding the leaked NH₃ deviation signal to the mole ratio signal, thereby obtaining a mole ratio-correcting signal;

means for transmitting each of the leaked NH₃ deviation signal from said comparator and the mole ratio signal from said mole ratio computing unit to said means for adding;

means for controlling an ammonia injection rate to said ammonia injection means by the mole ratio-correcting signal; and means for transmitting the mole ratio-correcting signal from said means for adding to said means for controlling.

2. An apparatus according to claim 4, wherein the mole ratio computing unit comprises means for computing the mole ratio, $M''$, according to the following equation:

$$M' = F(G, T, NO_{xi}, S-NH_3)$$

wherein:
G: flue gas flow rate in N m³/hr,
T: flue gas temperature in °C.,
$NO_{xi}$: inlet $NO_x$ in ppm, and
S—NH₃: leaked NH₃ in ppm.

3. An apparatus according to claim 4, wherein the leaked NH₃ computing unit comprises means for computing leaked NH₃ according to the following equation:

$$S-NH_3 = F(M'', NO_{xi}, N_{xo})$$

wherein:
S—NH₃: leaked NH₃ in ppm,
$NO_{xi}$: inlet $NO_x$ in ppm,
$M''$: NH₃/$NO_x$ mole ratio, and
$NO_{xo}$: outlet $NO_x$ in ppm.

4. An apparatus according to claim 1, wherein said injection means comprises an ammonia injection pipe in said flue gas pasage downstream of said gas temperature detector and said inlet $NO_x$ detector and upstream of said $NO_x$ removal unit.

5. An apparatus according to claim 1, wherein said means for controlling the ammonia injection rate comprises a multiplier for generating a total $NO_x$ amount signal from the gas flow rate detection signal and the inlet $NO_x$ detection signal, and a multiplier for determining the ammonia injection rate from the mole ratio-correcting signal and the total $NO_x$ amount signal.

6. An apparatus according to claim 1, wherein said gas temperature detector is provided in said flue gas passage.

7. An apparatus according to claim 6, wherein said inlet $NO_x$ detector is provided in said flue gas passage.

8. An apparatus according to claim 7, wherein said outlet $NO_x$ detector is provided in said flue gas pasage.

* * * * *